(12) United States Patent
Yang et al.

(10) Patent No.: US 8,390,736 B2
(45) Date of Patent: Mar. 5, 2013

(54) SHOOTING PARAMETER ADJUSTMENT METHOD FOR FACE DETECTION AND IMAGE CAPTURING DEVICE FOR FACE DETECTION

(75) Inventors: Shu-Sian Yang, Hsinchu (TW); Ren-Hau Gu, Hsinchu (TW); Yi-Fang Lee, Hsinchu (TW); Ming-Tsan Kao, Hsinchu (TW); Teo-Chin Chiang, Hsinchu (TW); Chi-Chieh Liao, Hsinchu (TW); Wei-Ting Chan, Hsinchu (TW); Yu-Hao Huang, Hsinchu (TW)

(73) Assignee: Pixart Imaging Inc., Hsinchu (TW)

( * ) Notice: Subject to any disclaimer, the term of this patent is extended or adjusted under 35 U.S.C. 154(b) by 304 days.

(21) Appl. No.: 12/820,920

(22) Filed: Jun. 22, 2010

(65) Prior Publication Data

US 2010/0328498 A1     Dec. 30, 2010

Related U.S. Application Data

(60) Provisional application No. 61/220,559, filed on Jun. 25, 2009.

(51) Int. Cl.
*H04N 5/238* (2006.01)
*G06K 9/00* (2006.01)

(52) U.S. Cl. ...................................... 348/364; 382/118
(58) Field of Classification Search .................. None
See application file for complete search history.

(56) References Cited

U.S. PATENT DOCUMENTS

2007/0196097 A1* 8/2007 Sugimoto ..................... 396/234
2009/0316016 A1* 12/2009 Iwamoto ..................... 348/222.1
2010/0271507 A1* 10/2010 Hung et al. ............... 348/231.99

* cited by examiner

*Primary Examiner* — Albert Cutler
(74) *Attorney, Agent, or Firm* — Morris Manning & Martin LLP; Tim Tingkang Xia, Esq.

(57) ABSTRACT

A shooting parameter adjustment method for face detection includes (A) acquiring an image; (B) dividing the image into a plurality of blocks, and calculating a brightness value of each of the blocks; (C) selecting at least one of the plurality of blocks, and adjusting a shooting parameter according to the brightness value of the selected block; and (D) acquiring another image according to the shooting parameter, and performing a face detection procedure with the another image. The shooting parameter adjustment method can automatically adjust a shooting parameter of an image capturing device according to brightness of different blocks in an image. Therefore, by using this method, the brightness of a face, no matter being too high or too low, can be adjusted to a value suitable for face detection, so as to improve the accuracy of the face detection procedure.

16 Claims, 8 Drawing Sheets

SHOOTING PARAMETER ADJUSTMENT METHOD FOR FACE DETECTION AND IMAGE CAPTURING DEVICE FOR FACE DETECTION

CROSS-REFERENCE TO RELATED APPLICATIONS

This non-provisional application claims priority under 35 U.S.C. §119(e) on Patent Application No(s). 61/220,559 filed in the United States on Jun. 25, 2009, the entire contents of which are hereby incorporated by reference.

BACKGROUND OF THE INVENTION

1. Field of Invention

The present invention relates to a shooting parameter adjustment method, and more particularly to a shooting parameter adjustment method for face detection.

2. Related Art

Nowadays, an image capturing device has been widely used in the daily life. The image capturing device captures images by using a photo-sensor and converts the images into digital signals, and the digital signals can be stored. Various applications are designed with the digital signals captured by the image capturing device in combination with digital image processing techniques.

The human image is the core of images captured by the image capturing device. For example, currently, many image capturing devices have face detection and face tracking techniques, which assist in automatic multi-focusing of a shot region. In addition, the face detection technique may also be used for determining human presence in a specific region. For example, the face detection technique can be applied to determine whether a user is watching a television (TV) screen in front of the TV screen. When it is determined by the face detection technique that currently nobody is in front of the TV screen, the TV screen can be automatically turned off to achieve the efficacy of energy saving.

However, when an image capturing device shoots an image, a method for calculating a shooting parameter (a shutter value or an aperture value) is usually single-point photometry or average photometry. Since the position of a face cannot be known in advance before face detection is performed, the face may appear too bright or too dark in the above photometry. For example, when shot against the light source, the brightness of the face is far lower than that of the background. On the contrary, when shot facing the light source, the brightness of the face is much higher than that of the background. In the case that the brightness of the face is excessively high or low, relevant features in the image of the face may be lost due to overexposure or underexposure of the features of the face.

SUMMARY OF THE INVENTION

In view of the above, the present invention is a shooting parameter adjustment method for face detection, so as to solve the problem that a face cannot be detected when the brightness of the face is excessively high or low.

The present invention provides a shooting parameter adjustment method for face detection, which comprises: (A) acquiring an image; (B) dividing the image into a plurality of blocks, and calculating a brightness value of each of the blocks; (C) selecting a plurality of the blocks, and calculating an average value of the brightness values of the selected blocks; (D) adjusting a shooting parameter according to the average value; and (E) acquiring another image according to the shooting parameter, and performing a face detection procedure with the another image.

In an embodiment of the present invention, after the face detection procedure is completed, different processes will be performed according to a determination result of the face detection.

If it is determined by the face detection that no face is detected, Steps (B), (C), and (D) are repeatedly performed until at least one face is detected.

If it is determined by the face detection that a face is detected, a face tracking procedure is performed. In addition, a face brightness value may be calculated according to at least one face region tracked by the face tracking procedure, and the shooting parameter may be adjusted with the face brightness value.

The present invention further provides a shooting parameter adjustment method for face detection, which comprises: (A) acquiring an image; (B) dividing the image into a plurality of blocks, and calculating a brightness value of each of the blocks; (C) selecting one of the plurality of blocks, and adjusting a shooting parameter according to the brightness value of the selected block; and (D) acquiring another image according to the shooting parameter, and performing a face detection procedure with the another image.

In addition, the present invention further provides an image capturing device for face detection, which comprises a photosensitive element, a lens device, and a microprocessor. The photosensitive element is used for capturing an optical signal and generating a first image signal. The lens device changes brightness of the first image signal generated by the photosensitive element according to a shooting parameter. The microprocessor is used for receiving the image signal, and detecting a face in the image signal. When the microprocessor is unable to detect the face, the microprocessor adjusts the shooting parameter, and then the photosensitive element captures the optical signal according to the adjusted shooting parameter. Based on the above, the shooting parameter adjustment method provided in the present invention can automatically adjust a shooting parameter of the image capturing device according to brightness of different blocks in an image, so as to improve the success rate of face recognition.

BRIEF DESCRIPTION OF THE DRAWINGS

The present invention will become more fully understood from the detailed description given herein below for illustration only, and thus are not limitative of the present invention, and wherein.

DETAILED DESCRIPTION OF THE INVENTION

The detailed features and advantages of the present invention are described below in great detail through the following embodiments, and the content of the detailed description is sufficient for those skilled in the art to understand the technical content of the present invention and to implement the present invention accordingly. Based upon the content of the specification, the claims, and the drawings, those skilled in the art can easily understand the relevant objectives and advantages of the present invention.

Figure 1:
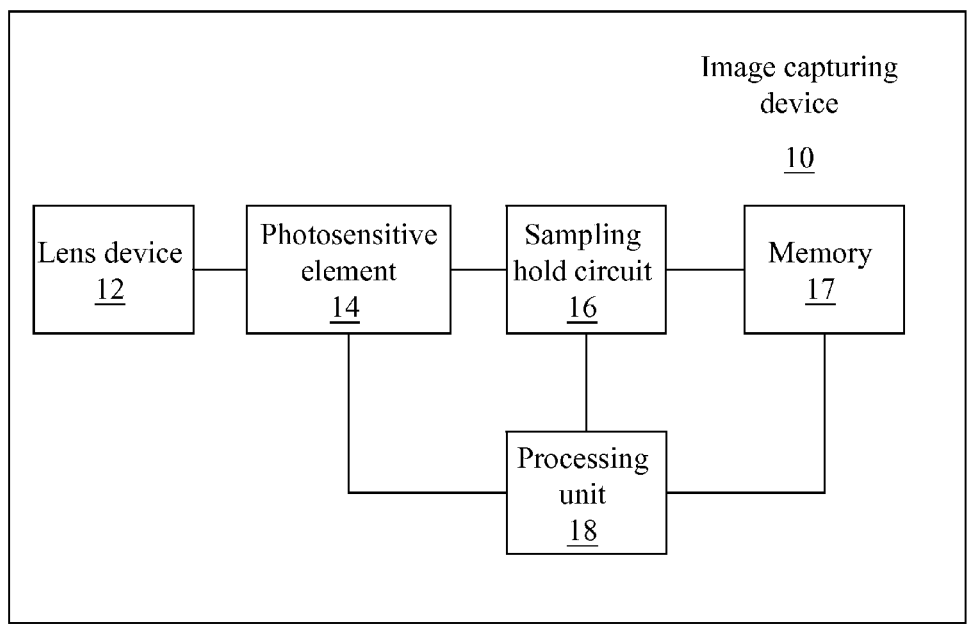
FIG. 1 is a schematic block diagram of an image capturing device to which the present invention is applicable.

FIG. 1 is a schematic architectural view of an image capturing device to which the present invention is applicable. The image capturing device to which the present invention is applicable may be, but is not limited to, the architecture shown in FIG. 1.

Referring to FIG. 1, the image capturing device 10 comprises a lens device 12, a photosensitive element 14, a sampling hold circuit 16, a memory 17, and a processor 18.

Light reflected by a scene in front of the lens device 12 enters the photosensitive element 14 through the lens device 12. The photosensitive element 14 changes brightness of an optical signal according to a shooting parameter. The photosensitive element 14 may be a charge-coupled device (CCD) or a complementary metal-oxide-semiconductor (CMOS). The photosensitive element 14 is used for capturing an optical signal, and periodically or non-periodically generating a plurality of image signals (for example, a first image signal and a second image signal). After these image signals are transmitted to the sampling hold circuit 16, an image file may be recorded in the memory 17. The processor 18 may be a microprocessor, a micro-controller, an application-specific integrated circuit (ASIC), or a field programmable gate array (FPGA). The processor 18 can not only be used for controlling the photosensitive element 14, the sampling hold circuit 16, and the memory 17, but also used for performing a shooting parameter adjustment method provided in the present invention.

Figure 2:
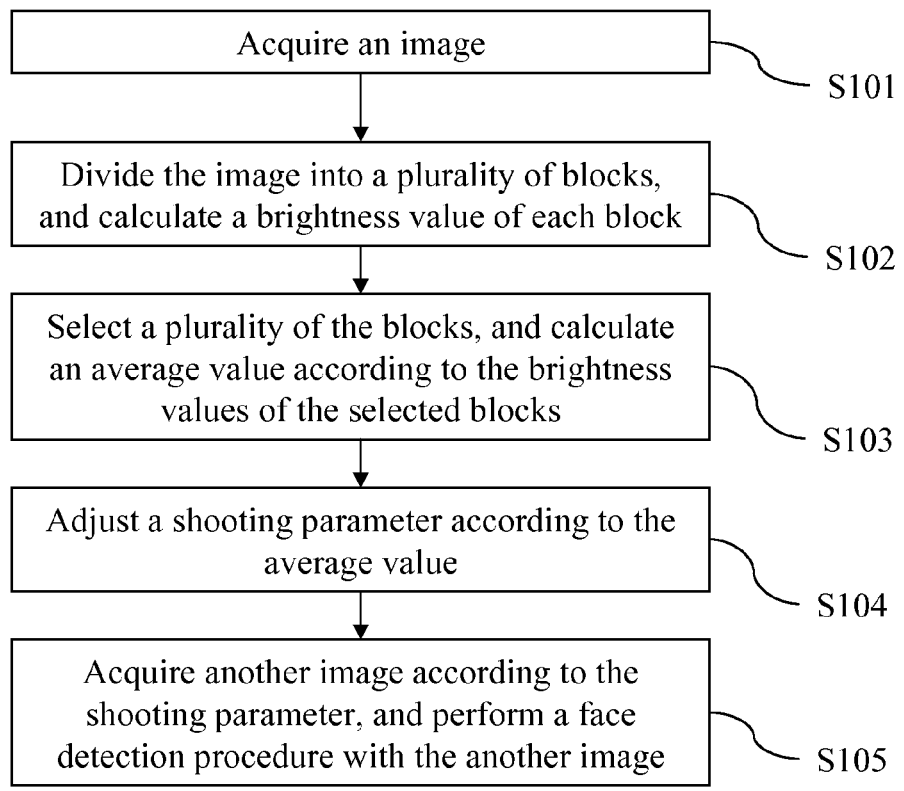
FIG. 2 is a flow chart of a first embodiment of a shooting parameter adjustment method provided in the present invention.

FIG. 2 is a flow chart of a first embodiment of a shooting parameter adjustment method provided in the present invention.

Referring to FIG. 2, in Step S101, the above image capturing device 10 is used to acquire an image, for example, a first image or a second image.

In Step S102, the acquired image is divided into a plurality of blocks which are preferably squares. For example, the above image may be divided into a plurality of blocks in a 3×3, 4×4, or 5×5 pattern. Afterwards, brightness of each block is calculated according to the divided blocks respectively. The brightness of each block is defined as an average value of brightness of all pixels in the block. The brightness of a pixel is defined as a Y value in YUV color values of the pixel. Each block generates a brightness value.

In Step S103, one or a part of the blocks are selected, and an average value is calculated according to the brightness value(s) of the selected block(s).

When Step S103 is repeatedly performed, the method of selecting different blocks may be divided into the following two methods: (1) ordering a plurality of blocks in an image according to brightness values, and selecting a part of the blocks according to the brightness values; and (2) selecting a part of a plurality of blocks according to positions of the blocks.

In the above first method, it is assumed that the first image is divided into K blocks arranged from low to high according to brightness values, and brightness values of a plurality of successive blocks after ordering are selected and averaged, for example, brightness values of an $N^{th}$ block to an $(N+M)^{th}$ block are selected and averaged, where N and M are positive integers, and N+M is smaller than or equal to K.

Afterwards, when this step is repeated, it is also assumed that the second image is divided into K blocks arranged from low to high according to brightness values, and brightness values of an $(N+1)^{th}$ block to an $(N+M+1)^{th}$ block are selected and averaged, or brightness values of an $(N-1)^{th}$ block to an $(N+M-1)^{th}$ block are selected and averaged.

The average value described herein may be a geometric average value or a weighted average value.

For example, the image is divided into 25 blocks which are arranged according to brightness values and are respectively named as S1, S2, S3, ..., and S25. In this method, a plurality of successive blocks after ordering is selected, for example, blocks S11 to S15 are selected. Afterwards, when this step is repeated, blocks S12 to S16 or blocks S10 to S14 are selected.

The above method may have more variations, for example, only brightness close to an intermediate value after ordering is selected, that is, the brightest and darkest blocks are discarded. For example, only one or a part of blocks S6 to S20 are selected. This method can reduce the time of cyclic scan, but increases the probability that the original presence of a face in the image is determined by mistake as absence of the face.

In the above second method, the blocks may be arranged according to positions first. For example, it is assumed that the image is divided into 25 blocks which are respectively named as C1, C2, C3, ..., and C25 from the upper left corner to the lower right corner of the image. In the second method, a plurality of blocks, for example, blocks C11 to C15, is selected. When this step is repeated the next time, blocks C12 to C16 or blocks C10 to C14 are selected, and the rest can be deduced in the same manner.

In Step S104, a shooting parameter is adjusted according to the average value and a target value. The shooting parameter described herein may be a shutter value, an aperture value, or a combination of the shutter value and the aperture value. For example, if the average value is "100" and the target value is "150", it represents that the brightness of the currently selected blocks is too low. At this time, the processing unit 18 controls the lens device 12 to increase a shutter value (for example, to adjust the shutter value from 1/60 second to 1/30 second) or increase an aperture value (for example, to adjust the aperture value from f4 to f2.8) of the lens device 12 or to adjust both, so as to raise the brightness of the image. Moreover, if the average value is "180" and the target value is "150", it represents that the brightness of the currently selected blocks is too high. At this time, the processing unit 18 controls the lens device 12 to decrease the shutter value (for example, to adjust the shutter value from 1/60 second to 1/120 second) or decrease the aperture value (for example, to adjust the aperture value from f4 to f5.6) of the lens device 12 or to adjust both, so as to lower the brightness of the image.

It may be set to accomplish the adjustment of the shooting parameter on one image adjacent in time or in a multi-stage manner. In the multi-stage manner, a plurality of gradually increasing or decreasing target values is set. For example, if the average value is "50" and the final target value is "180", for the first time, the brightness value is adjusted to "100", then, to "140", and finally, to the target value "180". That is to say, the brightness of the image can be adjusted to the target value only after a time that three images are captured.

In Step S105, the adjusted shooting parameter is used as the shutter value or the aperture value of the image capturing device 10, then, another image, for example, the second image, is acquired by using the image capturing device 10, and a face detection procedure is performed with the image acquired at this time.

The face detection procedure is to detect whether the image has a face region according to a plurality of facial features. The facial features refer to characteristic regions on an ordinary human face, for example, eyes, eyebrows, nose, or mouth. When the detection procedure is performed, gradient direction information between the features may be found by using the features, and serve as the basis for detection. In addition, the profile, shape, or other features of a face may also be used as the basis for detection. The number of the facial features may be hundreds or thousands. After the image is filtered with the hundreds or thousands of features, a region conforming to the features is the face region.

A determination result is output after the face detection procedure is performed, so as to determine whether the image has a face.

By repeatedly performing Steps S101 to S105 to adjust the shooting parameter with different blocks respectively, the brightness of the face is suitable for face recognition, thereby improving the success rate of face recognition.

Figure 3:
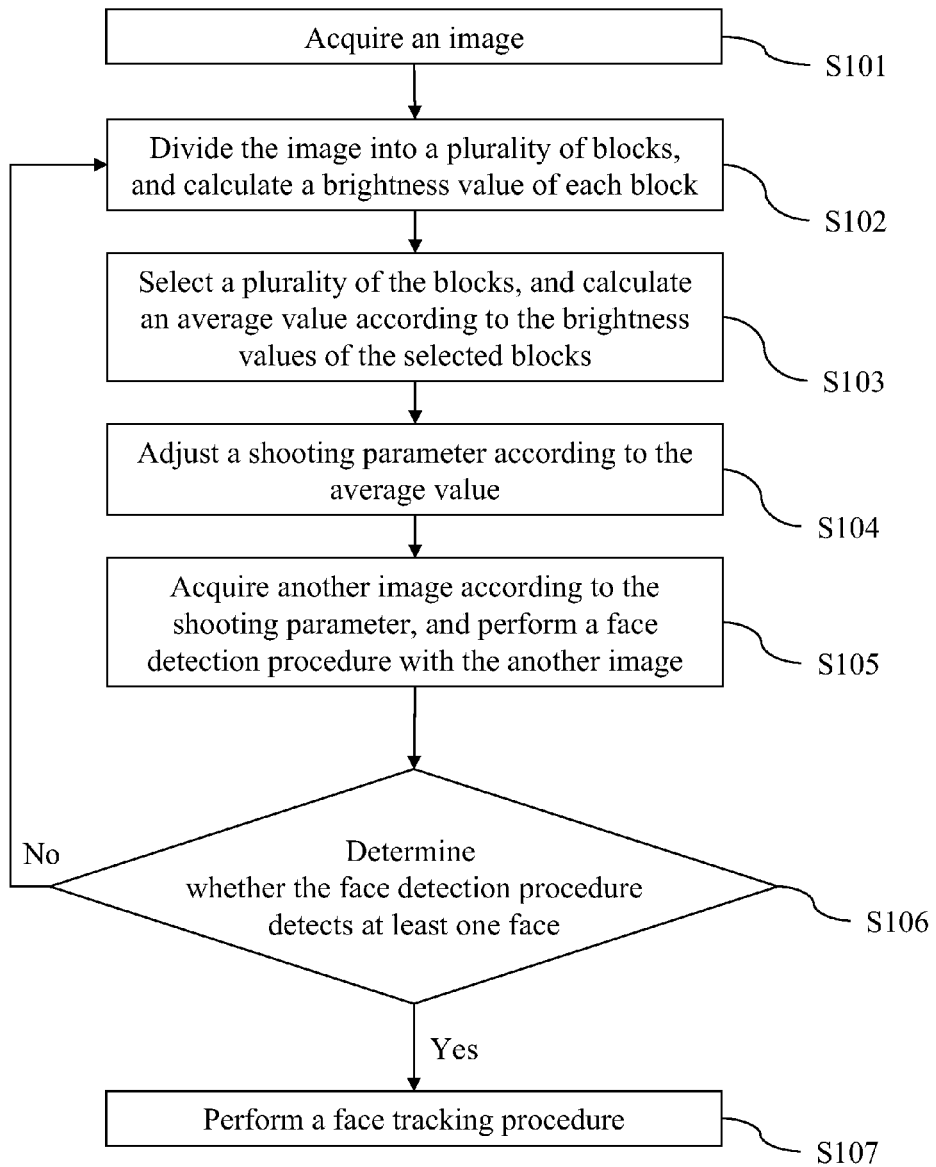
FIG. 3 is a flow chart of a second embodiment of the shooting parameter adjustment method provided in the present invention.

FIG. 3 is a flow chart of a second embodiment of the shooting parameter adjustment method provided in the present invention.

Referring to FIG. 3, in Step S106, it is determined whether the image capturing device 10 detects at least one face according to the determination result output by the face detection procedure after Steps S101 to S105 are performed.

If the determination result is yes, it represents that at least one face is detected, and the brightness of the face is moderate. At this time, a face tracking procedure may be performed. The face tracking procedure is to calculate a region most similar to the recognized face in the subsequent image based on the recognized face, and use the calculated region as a face region for face tracking.

After the face tracking procedure is performed, the shooting parameter may remain fixed for a period of time. In addition, the shooting parameter may also be adjusted according to a difference between brightness in the face region found by the face tracking procedure and a target value.

If the determination result is no, it represents that no face exists in the image, or the face detection procedure makes a wrong determination due to excessively bright or dark light on the face in the image. Therefore, the shooting parameter at this time still needs to be adjusted so as to find the brightness most suitable for face detection. In this case, when the determination result is no, Steps S102 to S106 are repeated, and brightness values of different blocks in the image are used as the basis for adjusting the shooting parameter.

Figure 4:
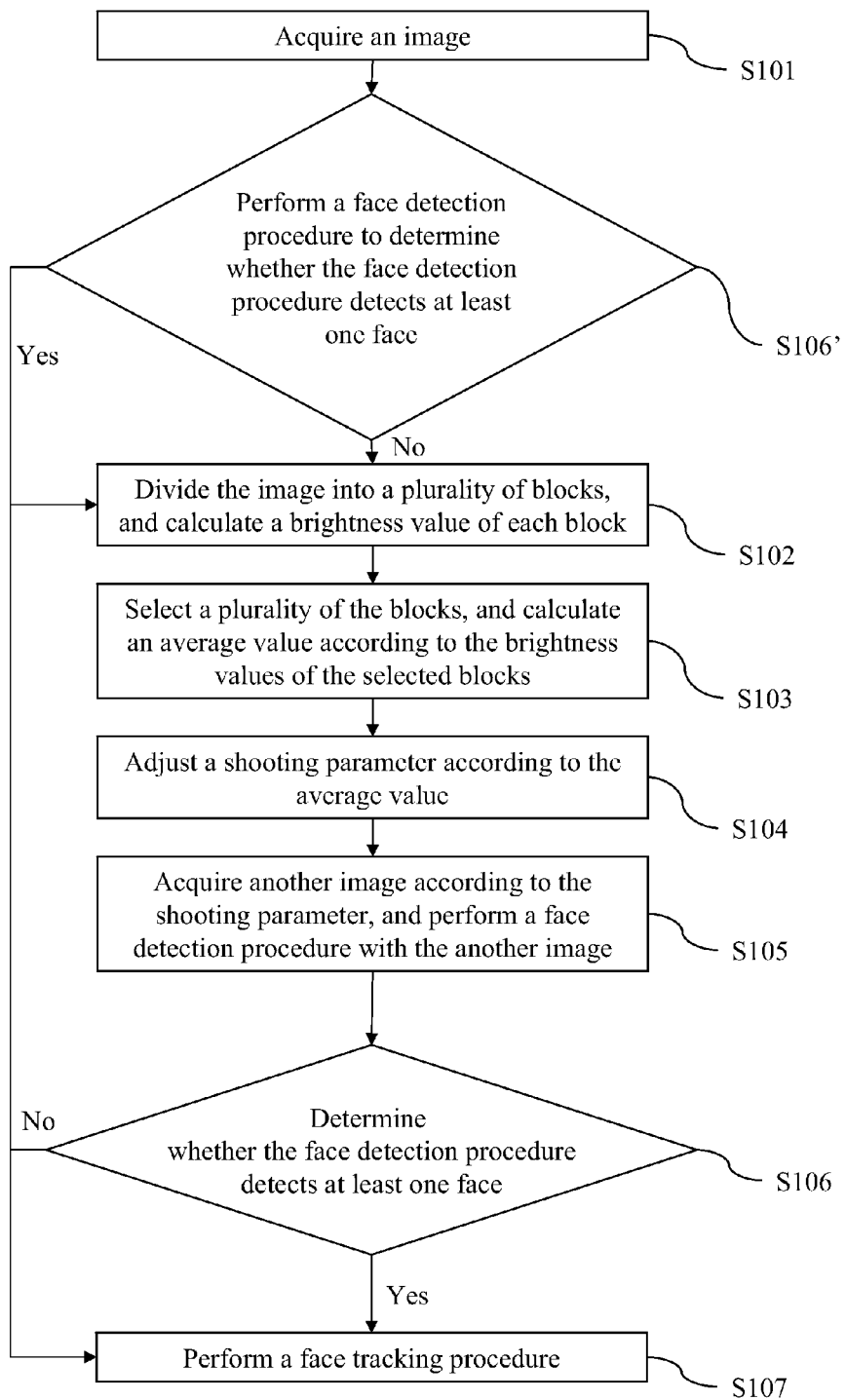
FIG. 4 is a flow chart of a third embodiment of the shooting parameter adjustment method provided in the present invention.

FIG. 4 is a flow chart of a third embodiment of the shooting parameter adjustment method provided in the present invention.

Referring to FIG. 4, after Step S101, that is, after an image is acquired for the first time, a face detection procedure may be performed to determine whether the face detection procedure detects at least one face (Step S106'). If the determination result is yes, that is, when the face is detected, a face tracking procedure is performed (Step S107). If the determination result is no, Steps S102 to S106 are performed to adjust a shooting parameter and acquire another image.

Figure 5:
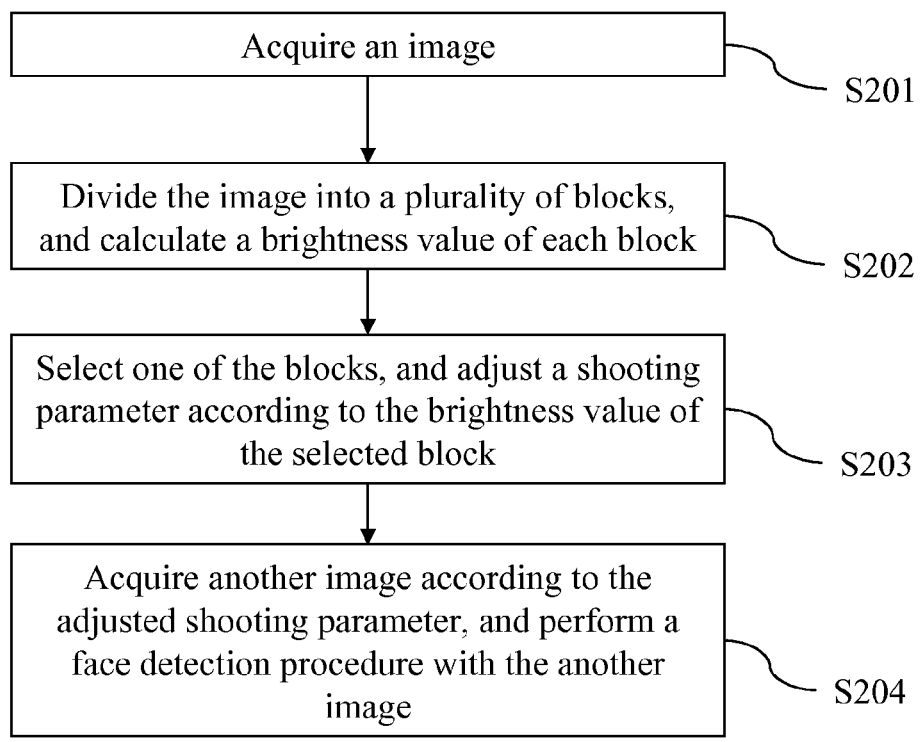
FIG. 5 is a flow chart of a fourth embodiment of the shooting parameter adjustment method provided in the present invention.

FIG. 5 is a flow chart of a fourth embodiment of the shooting parameter adjustment method provided in the present invention.

Referring to FIG. 5, in Step S201, the image capturing device 10 is used to acquire an image.

In Step S202, the acquired image is divided into a plurality of blocks which are preferably squares. For example, the above image may be divided into a plurality of blocks in a 3×3, 4×4, or 5×5 pattern. Afterwards, brightness of each block is calculated according to the divided blocks respectively. The brightness of each block is defined as an average value of brightness of all pixels in the block. The brightness of a pixel is defined as a Y value in YUV color values of the pixel. Each block generates a brightness value.

In Step S203, one of the plurality of blocks is selected, and an average value is calculated according to the brightness value of the selected block.

When Step S203 is repeatedly performed, the method of selecting different blocks may be divided into the following two methods: (1) ordering a plurality of blocks in an image according to brightness values, and selecting one of the plurality of blocks according to the brightness values; and (2) selecting one of a plurality of blocks according to positions of the blocks.

In the above first method, the blocks may be arranged according to brightness values first. For example, the image is divided into 25 blocks which are arranged according to brightness values and are respectively named as S1, S2, S3, . . . , and S25. In this method, a block after ordering is selected, for example, block S1 is selected. Afterwards, when this step is repeated, block S2 is selected.

The above method may have more variations, for example, only brightness close to an intermediate value after ordering is selected, that is, the brightest and darkest blocks are discarded. For example, only one of blocks S6 to S20 is selected. This method can reduce the time of cyclic scan, but increases the probability that the original presence of a face in the image is determined by mistake as absence of the face.

In the above second method, the blocks may be arranged according to positions first. For example, it is assumed that the image is divided into 25 blocks which are respectively named as C1, C2, C3, . . . , and C25 from the upper left corner to the lower right corner of the image. In the second method, a block, for example, block C1, is selected. When this step is repeated the next time, block C2 is selected, and the rest can be deduced in the same manner.

Afterwards, the brightness value of the selected block is used as a shutter value or an aperture value of the image capturing device 10, then, another image is acquired by using the image capturing device 10, and a face detection procedure is performed with the image acquired at this time.

The face detection procedure is to detect whether the image has a face region according to a plurality of facial features. The facial features refer to characteristic regions on an ordinary human face, for example, eyes, eyebrows, nose, or mouth. When the detection procedure is performed, gradient direction information between the features may be found by using the features, and serve as the basis for detection. In addition, the profile, shape, or other features of a face may also be used as the basis for detection. The number of the facial features may be hundreds or thousands. After the image is filtered with the hundreds or thousands of features, a region conforming to the features is the face region.

A determination result is output after the face detection procedure is performed, so as to determine whether the image has a face.

By repeatedly performing Steps S201 to S204 to adjust the shooting parameter with different blocks respectively, the brightness of the face is suitable for face recognition, thereby improving the success rate of face recognition.

Figure 6:
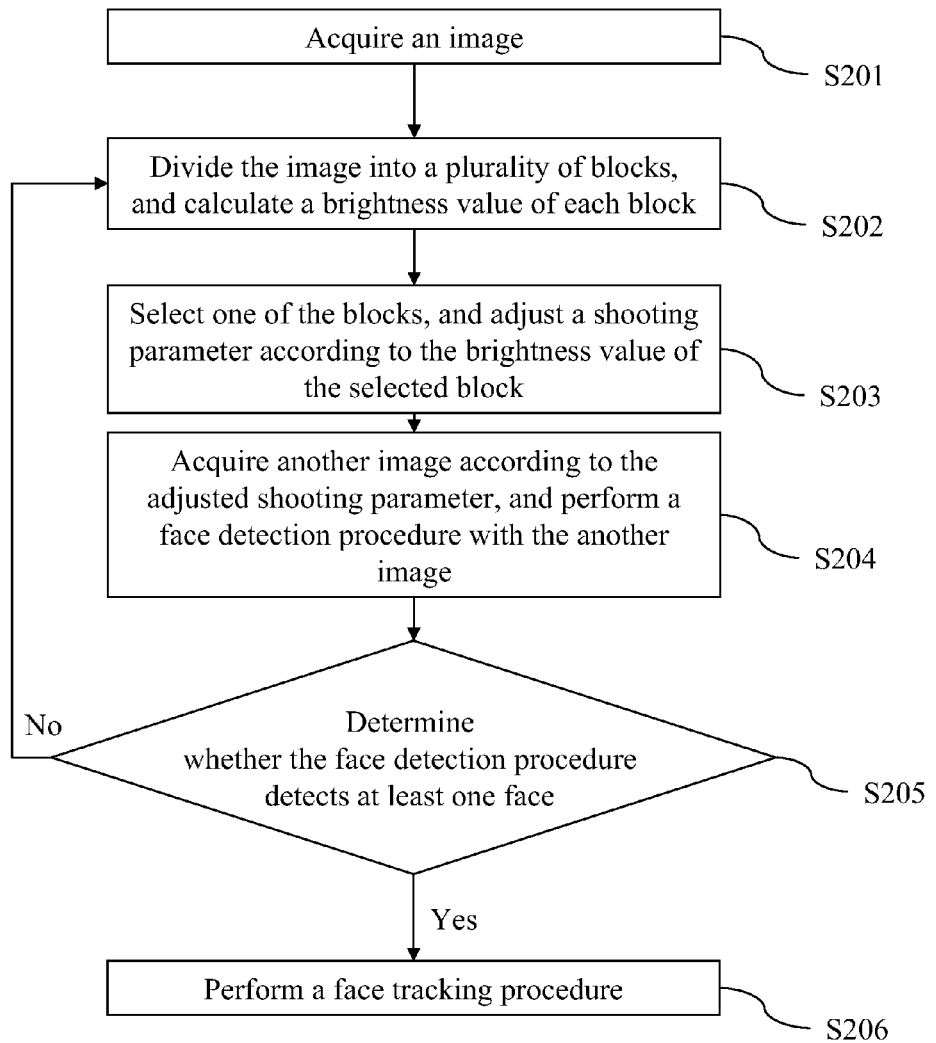
FIG. 6 is a flow chart of a fifth embodiment of the shooting parameter adjustment method provided in the present invention.

FIG. 6 is a flow chart of a fifth embodiment of the shooting parameter adjustment method provided in the present invention.

Referring to FIG. 6, in Step S205, it is determined whether the image capturing device 10 detects at least one face according to the determination result output by the face detection procedure after Steps S201 to S204 are performed.

If the determination result is yes, it represents that at least one face is detected, and the brightness of the face is moderate. At this time, a face tracking procedure may be performed. The face tracking procedure is to calculate a region most similar to the recognized face in the subsequent image based on the recognized face, and use the calculated region as a face region for face tracking.

After the face tracking procedure is performed, the shooting parameter may remain fixed for a period of time. In addition, the shooting parameter may also be adjusted according to a difference between brightness in the face region found by the face tracking procedure and a target value.

If the determination result is no, it represents that no face exists in the image, or the face detection procedure makes a wrong determination due to excessively bright or dark light on the face in the image. Therefore, the shooting parameter at this time still needs to be adjusted so as to find the brightness most suitable for face detection. In this case, when the determination result is no, Steps S202 to S205 are repeated, and brightness values of different blocks in the image are used as the basis for adjusting the shooting parameter.

Figure 7:
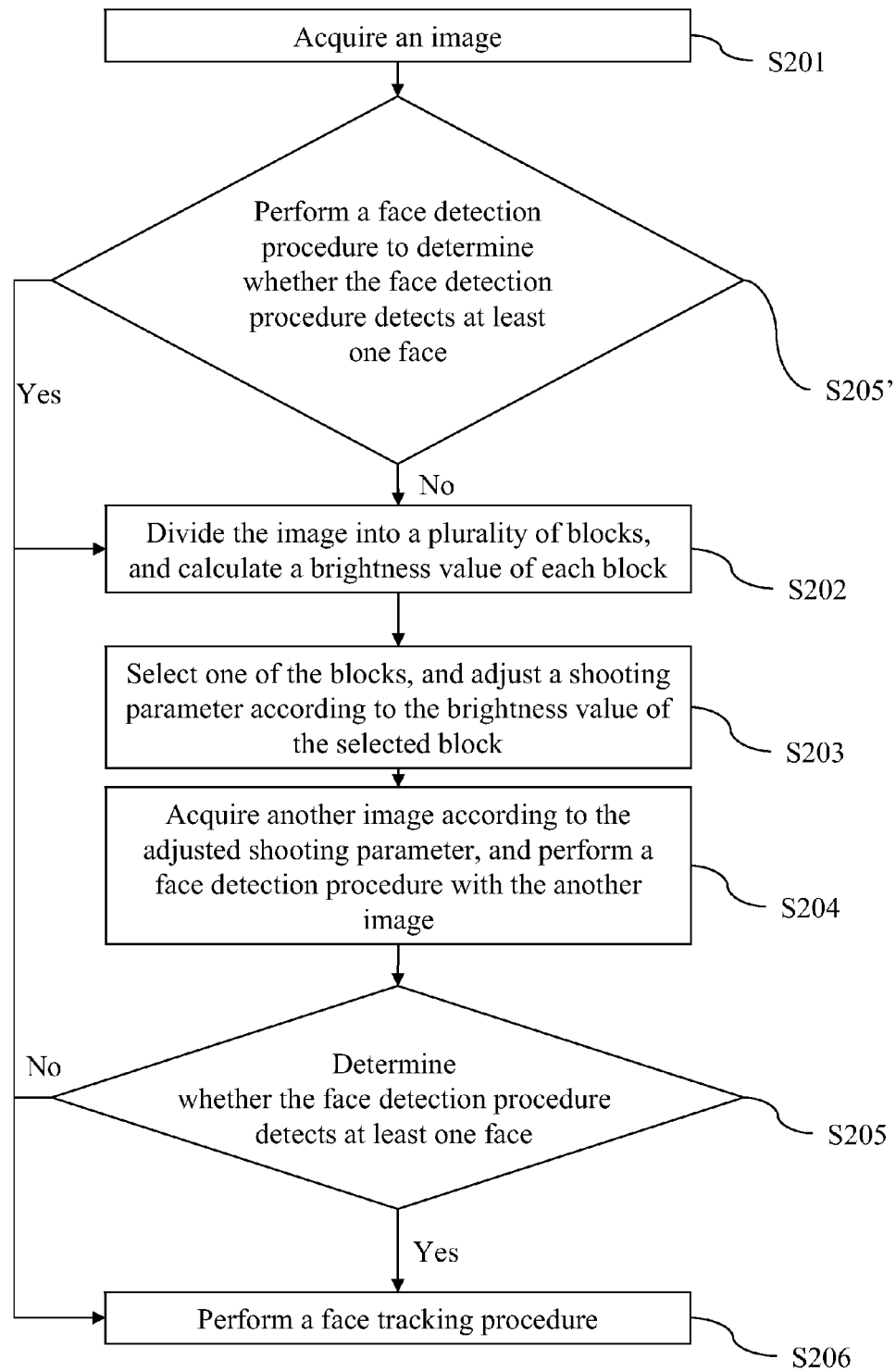
FIG. 7 is a flow chart of a sixth embodiment of the shooting parameter adjustment method provided in the present invention.

FIG. 7 is a flow chart of a sixth embodiment of the shooting parameter adjustment method provided in the present invention.

Referring to FIG. 7, after Step S201, that is, after an image is acquired for the first time, a face detection procedure may be performed to determine whether the face detection procedure detects at least one face (Step S205'). If the determination result is yes, that is, when the face is detected, a face tracking procedure is performed (Step S206). If the determination result is no, Steps S202 to S205 are performed to adjust a shooting parameter and acquire another image.

Figure 8:
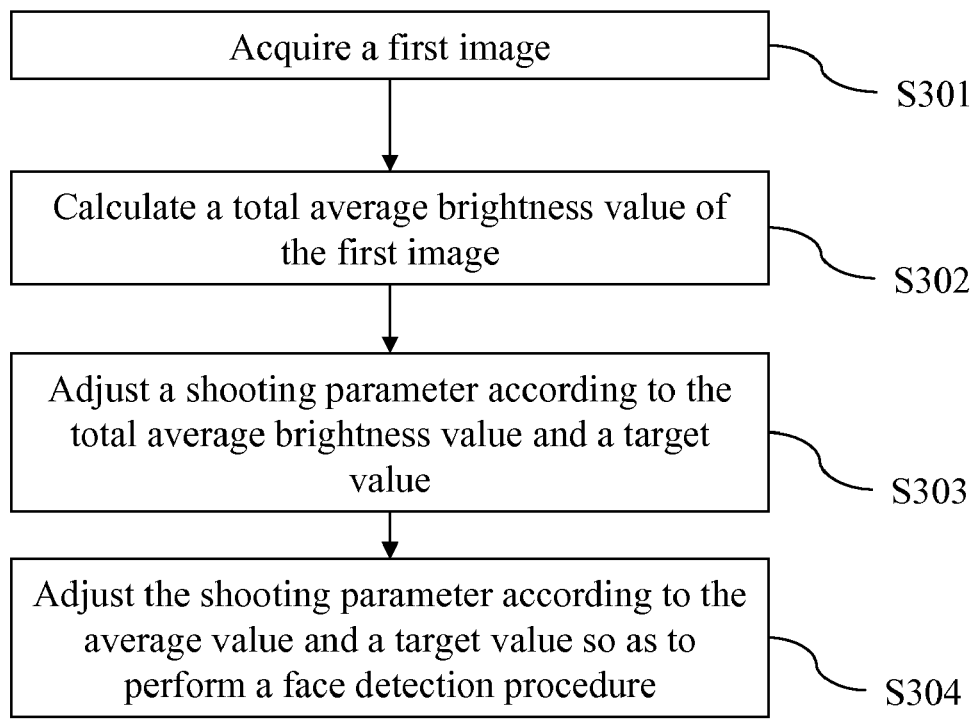
FIG. 8 is a flow chart of a seventh embodiment of the shooting parameter adjustment method provided in the present invention.

FIG. 8 is a flow chart of a seventh embodiment of the shooting parameter adjustment method provided in the present invention.

Referring to FIG. 8, in Step S301, the image capturing device 10 is used to acquire a first image.

In Step S302, a total average brightness value of the first image is calculated. The total average brightness is defined as an average brightness value of all pixels in the first image. This average value may be a geometric average value or a weighted average value.

In Step S303, a shooting parameter is adjusted according to the total average brightness value and a target value. The detailed method of this step is similar to that of Step S104, and thus will not be described herein again.

In Step S304, the shooting parameter is adjusted according to the average value and a target value.

Based on the above, the shooting parameter adjustment method provided in the present invention can automatically adjust a shooting parameter of the image capturing device according to brightness of different blocks in an image. Therefore, by using this method, the brightness of a face, no matter being too high or too low, can be adjusted to a value suitable for face detection, so as to improve the accuracy of the face detection procedure.

What is claimed is:

1. A shooting parameter adjustment method for face detection, comprising:
   (A) acquiring an image;
   (B) dividing the image into a plurality of first blocks,
   (C) averaging each of at least one part of the first blocks to acquire a brightness value of each of the first blocks;
   (D) ordering the brightness values of the first blocks according to brightness value;
   (E) averaging $N^{th}$ to $(N+M)^{th}$ brightness values of the first blocks to acquire an average value of the $N^{th}$ to $(N+M)^{th}$ brightness values of the first blocks;
   (F) adjusting a shooting parameter according to the average value of the $N^{th}$ to $(N+M)^{th}$ brightness values of the first blocks;
   (G) acquiring another image according to the adjusted shooting parameter, and performing a face detection procedure on the image acquired in (G) to determine whether any face exists in the image acquired in (G); and
   (H) repeating the steps (B) to (G), if no face exists in the image acquired in (G);
   wherein when no face exists in the image acquired in (G), averaging $(N+1)^{th}$ to $(N+M+1)^{th}$ brightness values of a plurality of second blocks of the image acquired in (G) to acquire an average value of the $(N+1)^{th}$ to $(N+M+1)^{th}$ brightness values of the second blocks, and then adjusting the shooting parameter according to the average value of the $(N+1)^{th}$ to $(N+M+1)^{th}$ brightness values of the second blocks.

2. The shooting parameter adjustment method for face detection according to claim 1, wherein if the face is detected in (G), performing a face tracking procedure.

3. The shooting parameter adjustment method for face detection according to claim 2, wherein after the face tracking procedure, a face brightness value is calculated according to at least one face region tracked by the face tracking procedure, and the shooting parameter is adjusted with the face brightness value.

4. The shooting parameter adjustment method for face detection according to claim 1, wherein (F) is adjusting the shooting parameter according to the average value and a target value.

5. The shooting parameter adjustment method for face detection according to claim 4, wherein the shooting parameter is an aperture value and/or a shutter value.

6. An image capturing device for face detection, comprising:
   a photosensitive element, for capturing an optical signal and generating a first image signal;
   a lens device, for changing brightness of the first image signal generated by the photosensitive element according to a shooting parameter; and
   a microprocessor, for receiving the first image signal, dividing the first image signal into a plurality of blocks, averaging each of at least one part of the blocks to acquire a plurality of block brightness values, ordering the block brightness values before averaging $N^{th}$ to $(N+M)^{th}$ brightness values to acquire an average value of the $N^{th}$ to $(N+M)^{th}$ brightness values so as to adjust the shooting parameter according to the average value of the $N^{th}$ to $(N+M)^{th}$ brightness values, and acquiring a second image signal according to the adjusted shooting parameter to determine whether any face exists in the second image signal, where N and M are both positive integers,
   wherein when no face exists, the microprocessor adjusts the shooting parameter again according to an average value of $(N+1)^{th}$ to $(N+M+1)^{th}$ brightness values of blocks of another image before determining whether any face exists in another image acquired according to the adjusted shooting parameter.

7. The image capturing device for face detection according to claim 6, wherein the shooting parameter is an aperture value and/or a shutter value.

8. The image capturing device for face detection according to claim 6, wherein when the microprocessor detects the face, a face brightness value of the face is calculated, and the shooting parameter is adjusted with the face brightness value.

9. A shooting parameter adjustment method for face detection, comprising:
(A) acquiring an image;
(B) dividing the image into a plurality of first blocks;
(C) averaging each of at least one part of the first blocks to acquire a brightness value of each of the first blocks;
(D) ordering the brightness values of the first blocks according to brightness value;
(E) averaging $N^{th}$ to $(N+M)^{th}$ brightness values of the first blocks to acquire an average value of the $N^{th}$ to $(N+M)^{th}$ brightness values of the first blocks;
(F) adjusting a shooting parameter according to the average value of the $N^{th}$ to $(N+M)^{th}$ brightness values of the first blocks;
(G) acquiring another image according to the adjusted shooting parameter, and performing a face detection procedure on the image acquired in (G) to determine whether any face exists in the image acquired in (G); and
(H) repeating (B) to (G), if no face exists in the image acquired in (G);
wherein when no face exists in the image acquired in (G), averaging $(N-1)^{th}$ to $(N+M-1)^{th}$ brightness values of a plurality of second blocks of the image acquired in (G) to acquire an average value of the $(N-1)^{th}$ to $(N+M-1)^{th}$ brightness values of the second blocks, and then adjusting the shooting parameter according to the average value of the $(N-1)^{th}$ to $(N+M-1)^{th}$ brightness values of the second blocks.

10. The shooting parameter adjustment method for face detection according to claim 9, wherein if the face is detected in (G), performing a face tracking procedure.

11. The shooting parameter adjustment method for face detection according to claim 10, wherein after the face tracking procedure, a face brightness value is calculated according to at least one face region tracked by the face tracking procedure, and the shooting parameter is adjusted with the face brightness value.

12. The shooting parameter adjustment method for face detection according to claim 9, wherein the shooting parameter is adjusted according to the average value and a target value.

13. The shooting parameter adjustment method for face detection according to claim 12, wherein the shooting parameter is an aperture value and/or a shutter value.

14. An image capturing device for face detection, comprising:
a photosensitive element, for capturing an optical signal and generating a first image signal;
a lens device, for changing brightness of the first image signal generated by the photosensitive element according to a shooting parameter; and
a microprocessor, for receiving the first image signal, dividing the first image signal into a plurality of blocks, averaging each of at least one part of the blocks to acquire a plurality of brightness values for the blocks, ordering the brightness values according to brightness value to average $N^{th}$ to $(N+M)^{th}$ block brightness values so as to adjust the shooting parameter according to the average value of the $N^{th}$ to $(N+M)^{th}$ brightness values, and acquiring a second image signal according to the adjusted shooting parameter to determine whether any face exists in the second image signal, where N and M are both positive integers;
wherein when no face exists, the microprocessor adjusts the shooting parameter again according to an average value of $(N-1)^{th}$ to $(N+M-1)^{th}$ ones of brightness values of at least one part of blocks of another image so as to determine whether any face exists in another image acquired according to the adjusted shooting parameter.

15. The image capturing device for face detection according to claim 14, wherein the shooting parameter is an aperture value and/or a shutter value.

16. The image capturing device for face detection according to claim 14, wherein when the microprocessor detects the face, a face brightness value of the detected face is calculated, and the shooting parameter is adjusted in accordance with the face brightness value.

* * * * *